May 26, 1953 — M. W. GUYER — 2,639,812
SLURRY TANK FOR SEED TREATING MACHINES
Filed June 13, 1949
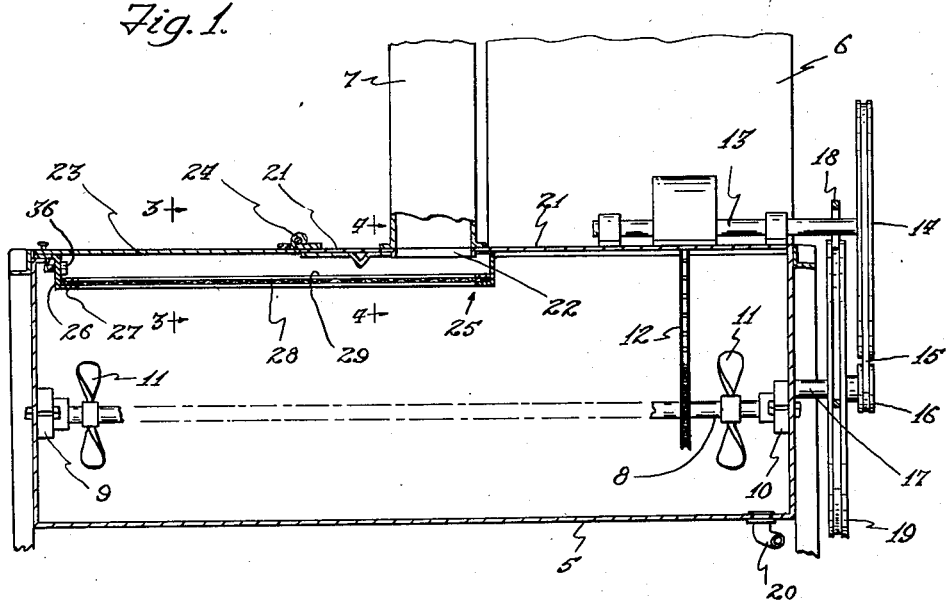
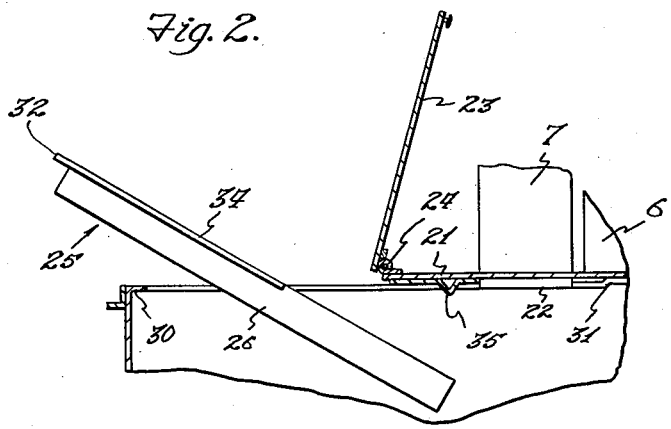
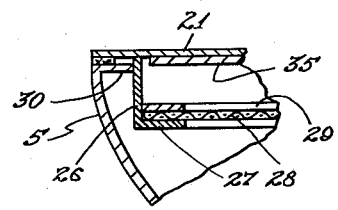
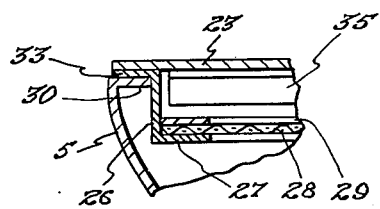
INVENTOR.
Morris W. Guyer
BY Glick Wells
Atty Patented May 26, 1953

2,639,812

UNITED STATES PATENT OFFICE 2,639,812

SLURRY TANK FOR SEED TREATING MACHINES

Morris W. Guyer, Spokane, Wash., assignor to Calkins Manufacturing Company, Spokane, Wash., a corporation of Washington Application June 13, 1949, Serial No. 98,832

3 Claims. (Cl. 210—155)

The present invention relates to improvements in a slurry tank for seed treating machines.

It is the principal purpose of the present invention to provide a novel slurry tank construction for machines of the character shown and described in my prior application, Serial Number 787,134, filed November 20, 1947, now Patent No. 2,600,641, issued June 17, 1952, for Seed Treating Machines. In machines of this character the slurry is a mixture of a chemical, an inert filler and water. The mixture must be agitated continuously to maintain the proper distribution of the chemical and the tank which carries the chemical must be of such a nature that it can be readily opened and cleaned, and new material supplied to it. The seeds which are being treated and other foreign matter should be carefully excluded from the slurry mixture since they will interfere with the delivery of the slurry to the mixing chamber where the slurry is mixed with the seeds.

The machine illustrated in my prior application embodies a seed hopper and a slurry measuring device so connected that the amount of slurry is governed by the amount of seed fed into the mixing chamber. In this machine the slurry is pumped into the measuring device and there is a continuous overflow of slurry which is returned to the slurry tank. It is the purpose of the present invention to provide a slurry tank construction wherein the overflow of slurry is directed back into the tank through a screen to prevent any seeds that might get into the overflow from returning to the tank and to prevent any lumps or bodies of chemical or inert filler from getting into the tank without being broken up, the screen being of such a nature that it also protects the filling opening of the slurry tank against entry of foreign matter such as seeds, straws and the like.

The nature and advantages of my invention will appear more fully from the following description and the accompanying drawings illustrating a preferred embodiment of the invention. It should be understood however, that the drawings and description are illustrative only and should not be considered as limiting the invention except insofar as it is limited by the claims.

In the drawings:

Figure 1 is a longitudinal sectional view through a slurry tank embodying my invention;

Figure 2 is a fragmentary sectional view of the tank showing the manner in which the screen is inserted and removed from the tank;

Figure 3 is an enlarged fragmentary sectional view taken on the line 3—3 of Figure 1; and Figure 4 is a fragmentary sectional view taken on the line 4—4 of Figure 1.

The slurry tank is illustrated at 5 in the drawings and is shown in connection with a seed hopper 6 and a slurry overflow housing 7. A slurry agitating shaft 8 is mounted in the tank 5 by means of bearings 9 and 10. The shaft 8 carries a number of agitators 11 and is driven by a sprocket chain 12 which in turn is driven by a shaft 13. The shaft 13 has a pulley 14 thereon which is rotated by a belt 15 passing over a pulley 16. The pulley 16 is on a mixer shaft 17 of the seed treating machine which is rotated by a motor, not shown, by means of a belt 18 and a pulley 19. An outlet conduit 20 for the slurry tank leads to a pump, not shown, which delivers the slurry to the measuring device that is mounted in the housing 7.

The slurry tank 5 has a cover 21 which has an aperture 22 through which slurry from the housing 7 is returned to the tank. For filling the slurry tank a portion 23 of the cover 21 is hinged at 24 so that it can be lifted.

According to my invention I provide a screen tray 25 which is so constructed that it may be inserted in the tank when the cover 23 is lifted and allow the cover to close. The screen tray 25 comprises a rectangular frame 26 which has an inwardly extending flange 27 on which a fine screen 28 is laid. A strip 29 is secured to the periphery of the screen 28 and fits within the screen tray 25. The slurry tank 5 has an inturned flange 30 at the top thereof and this flange is off-set downwardly as indicated at 31. The frame 26 has an end flange 32 and side flanges 33 and 34. The side flanges 33 and 34 extend only part way along the sides of the frame 26 so that the right hand end of the frame 26 as shown in Figures 1 and 2, can be inserted into the tank 5 through the filling opening that is covered by the part 23. A drip rib 35 is secured to the cover 21 between the inlet aperture 22 and the opening that receives the frame 26 so that slurry which splashes on the underside of the cover 21 will drip down before it gets into the hinged part 23.

It is believed to be evident from the drawings that the screen tray 25 can be readily inserted and removed. When the tray 25 is inserted, it is secured in place by a screw bolt 36 that is threaded through the frame 26 and is long enough to engage under the flange 30 at the end of the tank 5. The screen tray 25, when inserted, underlies the opening 22 by which the excess slurry is returned from the housing 7 to the tank 5. The screen tray 25 also prevents foreign material from entering the tank 5 when the cover part 23 is raised for inspection of the contents of the slurry tank or for the addition of water or the like. When the tray 25 or the tank 5 needs cleaning, the tray is readily removed to permit free access to the interior of the tank 5.

Having thus described my invention, I claim:

1. A slurry tank for seed treating machines having a cover in which there is a small slurry overflow inlet and a larger rectangular filling inlet, said inlets being spaced apart, the slurry overflow inlet being surrounded by an upstanding housing, the cover having a lid covering the filling inlet and movable to open the filling inlet, and a single screen tray in the tank, less in width than the filling inlet so it may enter the tank through the filling inlet, said tray extending beneath and providing a screen under the filling inlet and under the slurry overflow inlet, the tray being removable through the filling inlet by lifting the portion thereof below the filling inlet and swinging the portion thereof beneath the overflow inlet downwardly and then moving the tray edgewise through the filling inlet, the screen tray having means thereon engaging the edges of the cover around the filling inlet to support the screen tray on the cover beneath said lid, the cover having a depending rib thereon between the inlet openings which rib extends down into the tray.

2. A slurry tank for seed treating machines having a cover in which there is a small slurry overflow inlet and a larger rectangular filling inlet, said inlets being spaced apart, the slurry overflow inlet being surrounded by an upstanding housing, the cover having a lid covering the filling inlet and movable to open the filling inlet, and a single screen tray in the tank, less in width than the filling inlet so it may enter the tank through the filling inlet, said tray extending beneath and providing a screen under the filling inlet and under the slurry overflow inlet, the tray being removable through the filling inlet by lifting the portion thereof below the filling inlet and swinging the portion thereof beneath the overflow inlet downwardly and then moving the tray edgewise through the filling inlet, said tray having end and side flanges adapted to rest on the corresponding edges of the tank around the filling inlet, the side flanges terminating at the edge of the filling inlet closest to the overflow inlet.

3. A slurry tank for seed treating machines having a cover in which there is a small slurry overflow inlet and a larger rectangular filling inlet, said inlets being spaced apart, the slurry overflow inlet being surrounded by an upstanding housing, the cover having a lid covering the filling inlet and movable to open the filling inlet, and a single screen tray in the tank, less in width than the filling inlet so it may enter the tank through the filling inlet, said tray extending beneath and providing a screen under the filling inlet and under the slurry overflow inlet, the tray being removable through the filling inlet by lifting the portion thereof below the filling inlet and swinging the portion thereof beneath the overflow inlet downwardly and then moving the tray edgewise through the filling inlet, the tank having flanges beneath said lid offset below the cover level at the sides of the filling inlet and at the end of the filling inlet most remote from the overflow inlet and the screen tray having an end flange and side flanges adapted to rest on the said side flanges and end flange of the tank.

MORRIS W. GUYER.

References Cited in the file of this patent

UNITED STATES PATENTS

| Number | Name | Date |
|---|---|---|
| 1,902,733 | Smestad | Mar. 21, 1933 |
| 2,142,790 | Kodaira | Jan. 3, 1939 |
| 2,346,902 | Brotherton | Apr. 18, 1944 |